United States Patent [19]

Sikora

[11] Patent Number: 4,949,017
[45] Date of Patent: Aug. 14, 1990

[54] STROBE TRIGGER PULSE GENERATOR

[75] Inventor: Scott T. Sikora, Mesa, Ariz.

[73] Assignee: Tomar Electronics, Inc., Tempe, Ariz.

[21] Appl. No.: 350,783

[22] Filed: May 10, 1989

Related U.S. Application Data

[63] Continuation-in-part of Ser. No. 265,414, Oct. 31, 1988, which is a continuation-in-part of Ser. No. 238,039, Aug. 29, 1988, which is a continuation of Ser. No. 42,357, Apr. 24, 1987, Pat. No. 4,775,821, which is a continuation-in-part of Ser. No. 794,415, Nov. 4, 1984, Pat. No. 4,682,081.

[51] Int. Cl.$^5$ .................... H05B 41/14; H05B 41/29; H05B 41/34
[52] U.S. Cl. ................ 315/219; 315/241 R; 315/241 S; 315/241 P; 315/DIG. 7; 363/19; 363/131
[58] Field of Search ............ 315/241 R, 241 S, 241 P, 315/219, DIG. 7, 227 R; 363/19, 131, 18, 21, 97

[56] References Cited

U.S. PATENT DOCUMENTS

| | | | |
|---|---|---|---|
| 2,922,079 | 1/1960 | Borchers et al. | 315/234 |
| 3,376,470 | 4/1968 | Stone et al. | 315/171 |
| 3,953,763 | 4/1976 | Herrick | 315/241 S |
| 4,013,921 | 2/1977 | Corthell | 315/241 |
| 4,321,507 | 3/1982 | Bosnak | 315/241 |
| 4,486,691 | 12/1984 | Beggs | 315/241 |
| 4,800,323 | 1/1989 | Sikora | 315/241 S |

FOREIGN PATENT DOCUMENTS 0098335 5/1986 Japan .................... 315/241 S

OTHER PUBLICATIONS

The Exhibit A Tomar Microstrobe circuit Detail Prior to Invention Date.

Primary Examiner—Eugene R. Laroche
Assistant Examiner—Michael Shingleton
Attorney, Agent, or Firm—Cahill, Sutton & Thomas

[57] ABSTRACT

A strobe trigger pulse generator includes a power supply, an energy storage capacitorcoupled to the power supply and a trigger pulse generator which intermittently generates trigger pulses to energize a trigger pulse transformer. The pulse generator includes a trigger capacitor having first and second leads, the first of which is coupled to the trigger pulse transformer. A trigger capacitor charge circuit includes an input terminal coupled to the power supply and an output terminal coupled to the second lead of the trigger capacitor to establish a current flow path between the power supply and the trigger capacitor to direct a charge current to the trigger capacitor. A trigger capacitor discharge circuit is coupled to the second lead of the trigger capacitor to periodically direct a discharge current from the trigger capacitor through the trigger pulse transformer to generator a high voltage trigger pulse. A discharge current disabling circuit is coupled in series with the flow of discharge current from the trigger capacitor discharge circuit to selectively block or conduct the flow of discharge current from the trigger capacitor discharge circuit.

21 Claims, 14 Drawing Sheets

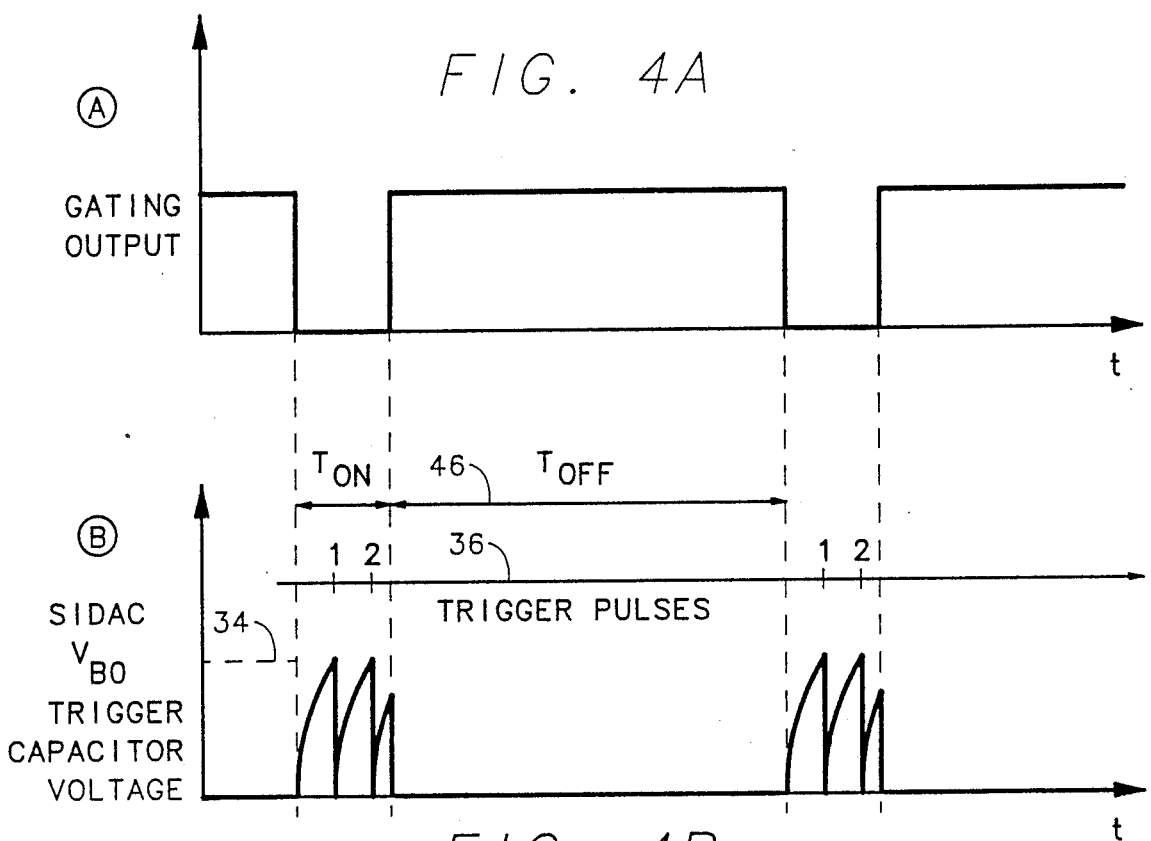
FIG. 4A
FIG. 4B
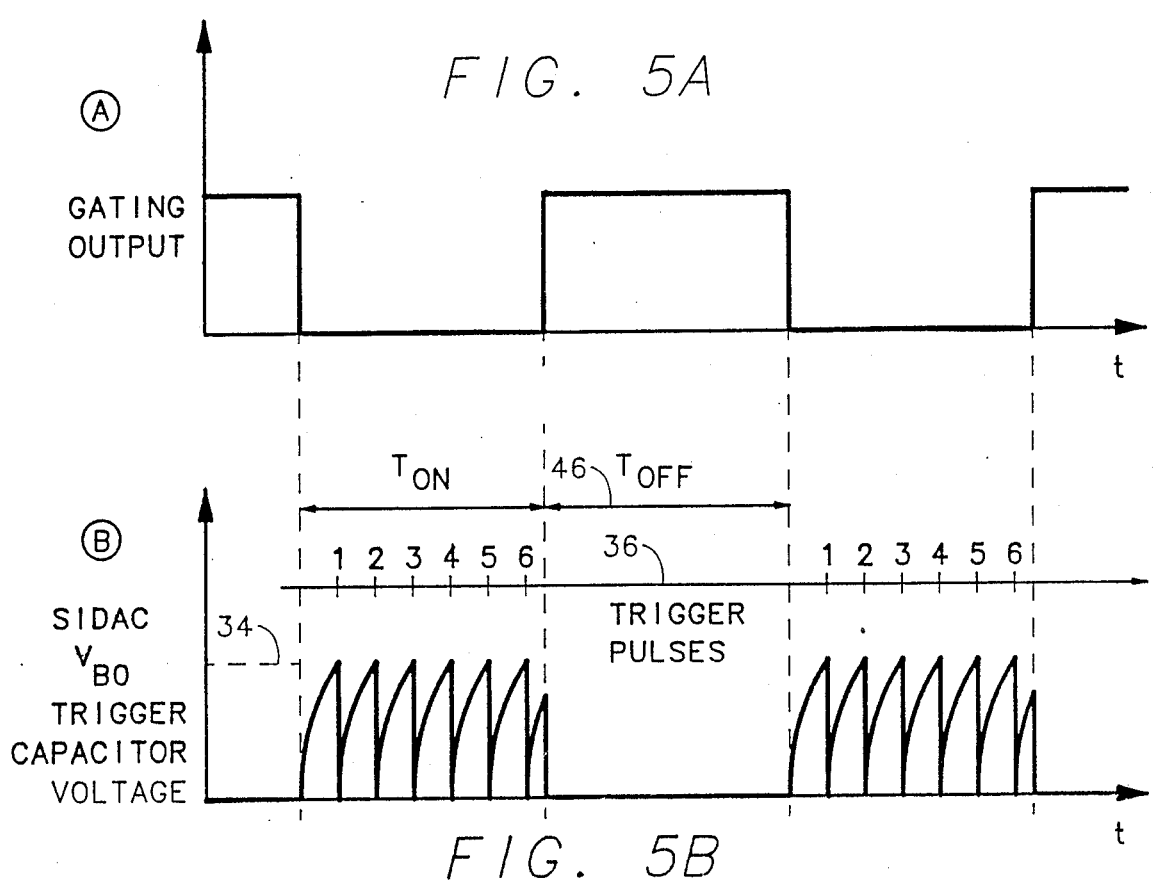
FIG. 5A
FIG. 5B

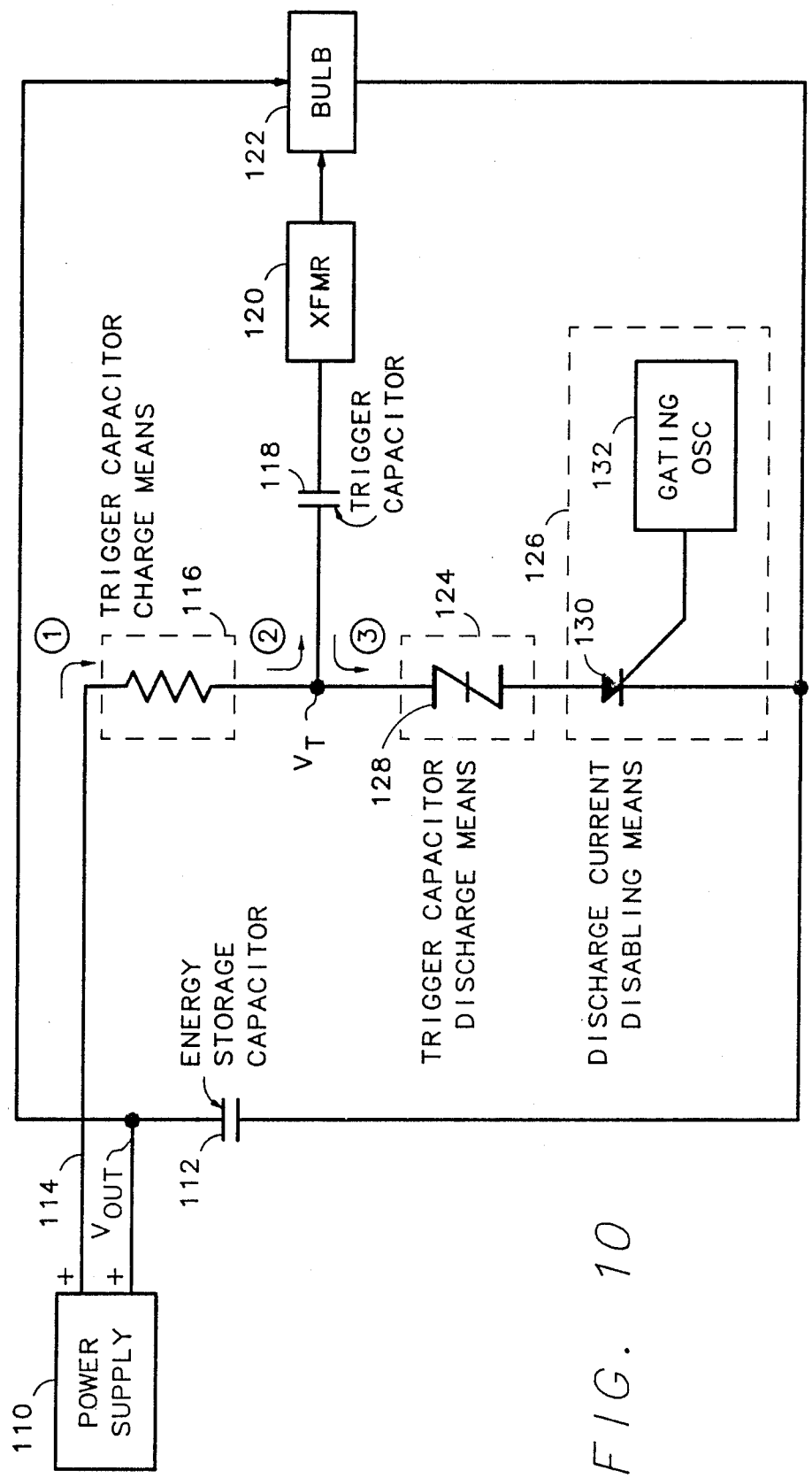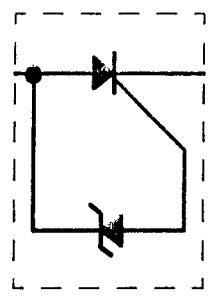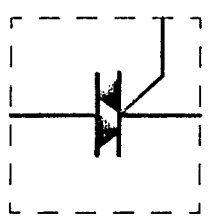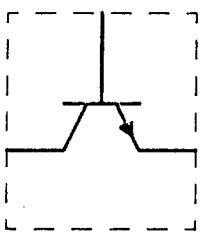
FIG. 10
FIG. 10A
FIG. 10B
FIG. 10C

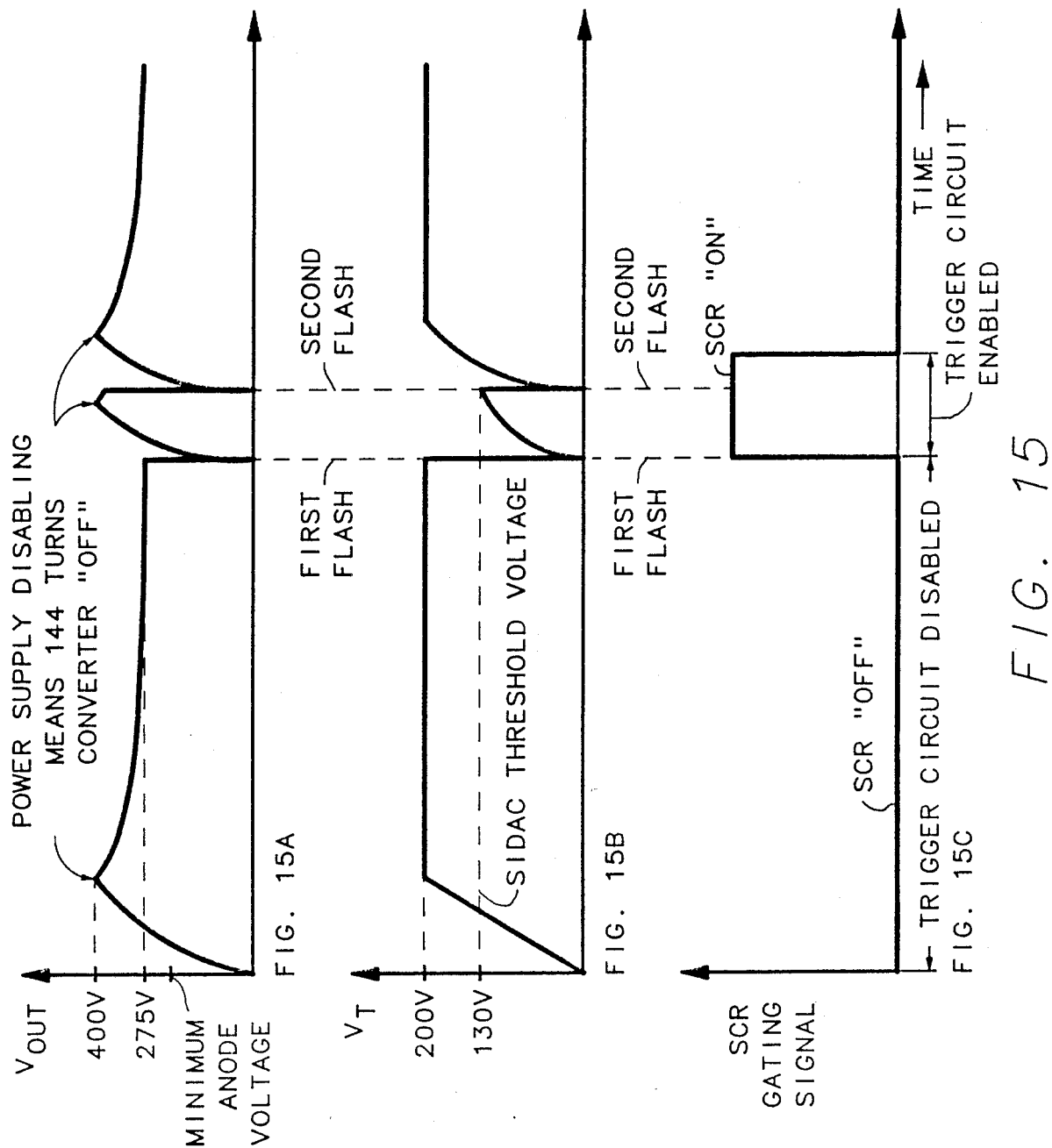

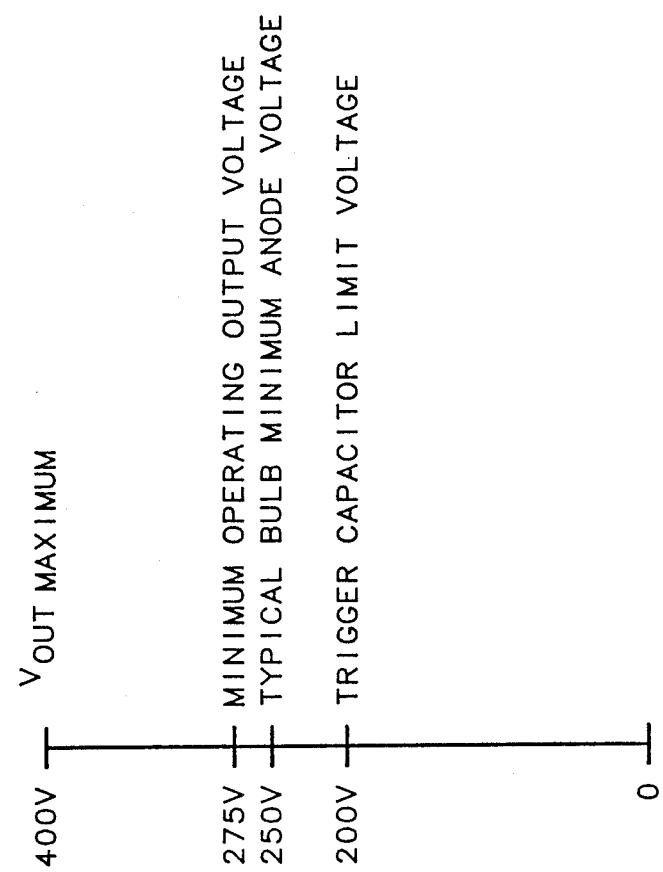

STROBE TRIGGER PULSE GENERATOR

This application is a Continuation-in-Part application of U.S. patent application Ser. No. 265,414 filed on Oct. 31, 1988 which is a Continuation-in-Part application of U.S. patent application Ser. No. 238,039 filed on Aug. 29, 1988, which is a Continuation application of U.S. patent application Ser. No. 042,357 filed on Apr. 24, 1987, now U.S. Pat. No. 4,775,821, which is a Continuation-in-Part application of U.S. patent application Ser. No. 794,415 filed on Nov. 4, 1984, now U.S. Pat. No. 4,682,081.

BACKGROUND OF THE INVENTION

1. Field of the Invention

This invention relates to power supplies for intermittently energizing a gaseous discharge tube, and more particularly, to the trigger pulse generator circuits of strobe power supplies.

2. Description of the Prior Art

Trigger pulse generators for prior art strobe lighting systems typically generate individual, spaced apart trigger pulses which initiate periodic optical output pulses from a strobe flash bulb. Another form of prior art strobe lighting device includes a trigger pulse generator which generates closely spaced, paired trigger pulses which some manufacturers refer to as a double flash output.

U.S. Pat. No. 4,013,921 (Corthell) discloses a strobe power supply having a trigger pulse generator which generates closely spaced, paired trigger output pulses for generating a double flash output. The Corthell circuit utilizes an integrated circuit square wave generator 26, the output of which is transmitted through a capacitor differentiator to produce a pulse in response to both the leading and trailing edges of each square wave output pulse. The first or positive going differentiator pulse is coupled to the gate of one SCR which generates a trigger pulse while the second or negative going differentiator pulse is coupled to the gate of a second SCR which generates a trigger pulse synchronized with the trailing edge of each square wave output pulse. The Corthell trigger circuit is unable to generate anything but closely spaced, paired trigger output pulses.

U.S. Pat. No. 4,321,507 (Bosnak) discloses another double flash strobe power supply circuit which includes an integrated circuit square wave timer. The square wave output of the timer is transmitted through a capacitor differentiator which generates a positive going pulse at the leading edge of each square wave and a negative going pulse at the trailing edge of each square wave. Closely, spaced, paired positive and negative going pulses from the capacitive differentiator are coupled to the gate of a triac which generates closely spaced, paired trigger pulses synchronized with the leading and trailing edges of each square wave generated by the timer circuit. The Bosnak circuit is thus able to generate a double flash output where each strobe lamp flash is synchronized with the leading and trailing edges of each square wave generated by the trigger pulse genertor timing device.

In another prior art device identified as the Tomar MICROSTROBE, the trigger pulse generator takes the form of a sidac-actuated relaxation oscillator including a series connected resistor and capacitor where the capacitor also serves as the trigger capacitor. A voltage controlled switch in the form of a sidac periodically assumes a short circuit condition when the trigger capacitor voltage reaches the sidac breakover voltage and generates a trigger pulse. With this prior art trigger pulse generator circuit, the frequency of the single flash output pulses is fixed.

SUMMARY OF THE INVENTION

It is therefore a primary object of the present invention to provide a strobe trigger pulse generator which is capable of generating trigger pulses in pulse trains which are spaced apart by a controllable time interval and which include a controllable number of trigger pulses from one to numerous trigger pulses per trigger pulse train.

Another object of the present invention is to provide a strobe trigger pulse generator which includes a free running trigger pulse generator which is alternately enabled to create a train of trigger pulses and which is then disabled for a controllable time to define the time interval between sequential pulse trains.

Another object of the present invention is to provide a strobe trigger pulse generator which can be user adjusted in real time to vary the number of trigger pulses generated in each trigger pulse train, or to vary the time interval between sequential trigger pulse trains.

Another object of the present invention is to provide a strobe trigger pulse generator which draws no current from the high voltage power supply and no current from the energy storage capacitor when the trigger pulse generator circuit is in the disabled state.

Briefly stated, and in accord with one embodiment of the invention, apparatus for delivering current to an intermittently energized gaseous discharge tube comprises a power supply, an energy storage capacitor coupled to the power supply and a trigger pulse generator which intermittently generates trigger pulses to energize a trigger pulse transformer. A trigger pulse generator includes a trigger capacitor having first and second leads where the first lead is coupled to the trigger pulse transformer. Trigger capacitor charge means includes an input terminal coupled to the power supply and an output terminal coupled to the second lead of the trigger capacitor for establishing a current flow path between the power supply and the trigger capacitor to direct a charge current to the trigger capacitor. Trigger capacitor discharge means is coupled to the second lead of the trigger capacitor to periodically direct a discharge current from the trigger capacitor through the trigger pulse transformer to generate a high voltage trigger pulse. Discharge current disabling means is coupled in series with the flow of discharge current from the trigger capacitor discharge means to selectively block or conduct the flow of discharge current from the trigger capacitor discharge means.

DESCRIPTION OF THE DRAWINGS

The invention is pointed out with particularly in the appended claims. However, other objects and advantages together with the operation of the invention may be better understood by reference to the following detailed description taken in connection with the following illustrations, wherein:

FIG. 4 represents a timing diagram illustrating the operation of the FIG. 3 embodiment of the invention adjusted to generate paired together pulse trains.

FIG. 5 represents a timing diagram illustrating the operation of the FIG. 3 embodiment of the invention adjusted to generate a pulse train output consisting of six individual trigger pulses.

FIG. 10 represents a more specific block diagram embodiment of the strobe trigger pulse generator illustrated in FIG. 9. FIGS. 10A, 10B and 10C represents alternative active element embodiments of the trigger capacitor discharge means of the present invention.

FIG. 15 represents a timing diagram illustrating and explaining the operation of the strobe trigger pulse generators illustrated in the FIG. 12, 13 and 14 block diagrams. FIG. 15A depicts the variation in output voltage versus time; FIG. 15B illustrates the variation in the trigger capacitor voltage with time; and FIG. 15C illustrates variation in the SCR gating signal versus time.

FIG. 16 represents a chart showing the relationship between various voltage levels of the strobe trigger pulse generator of the present invention.

DESCRIPTION OF THE PREFERRED EMBODIMENT

In order to better illustrate the advantages of the invention and its contribution to the art, a preferred hardware embodiment of the invention will now be described in some detail.

Figure 1:
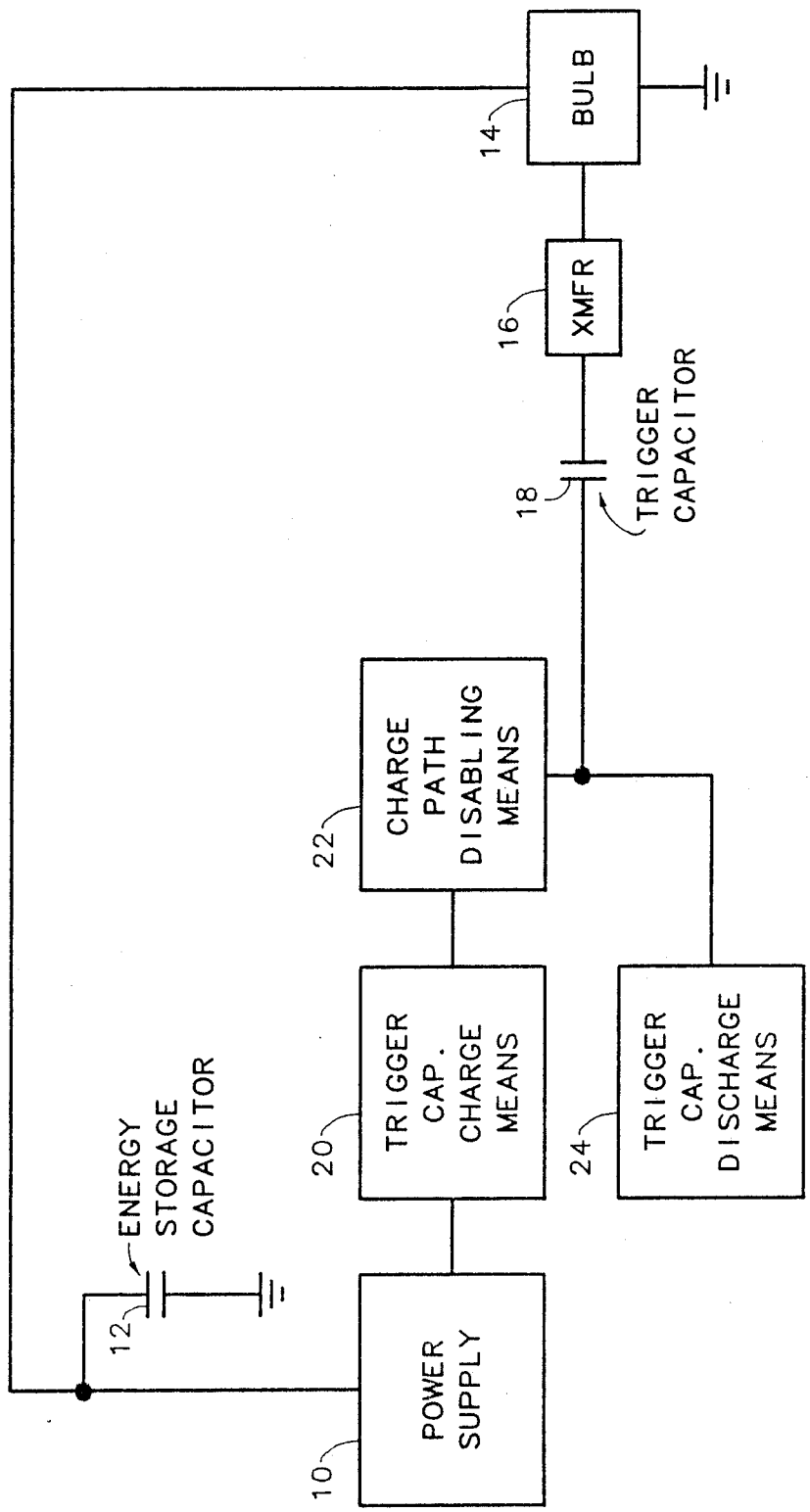
FIG. 1 is a generalized block diagram of one embodiment of the strobe trigger pulse generator of the present invention.

Referring now to FIG. 1, the most general form of the strobe trigger pulse generator of the present invention forms a part of a strobe power supply including a power supply element 10, an energy storage capacitor 12 and a gaseous discharge tube such as a xenon flash tube or bulb 14. A trigger pulse generating circuit is required to convert the comparatively low voltage power supply voltage to a four to six thousand volt trigger pulse capable of ionizing the gaseous interior of bulb 14. The trigger pulse generator circuit generates a trigger pulse which is stepped up by trigger pulse transformer 16 to the required high voltage level necessary to ionize bulb 14. Trigger capacitor 18 is charged over a comparatively long time interval and is periodically rapidly discharged to provide the pulsed input voltage for trigger transformer 16.

As illustrated in FIG. 1, trigger capacitor charge means 20 includes an input terminal coupled to power supply 10 and includes an output terminal coupled through charge path disabling means 22 to trigger capacitor 18 to thereby establish a current flow path between power supply 10 and trigger capacitor 18 to selectively direct a charging current to the trigger capacitor. Trigger capacitor discharge means 24 is also coupled to trigger capacitor 18 to periodically discharge the trigger capacitor through trigger pulse transformer 16 to generate a high voltage trigger pulse. Charge path disabling means 22 is coupled to the current flow path between power supply 10 and trigger capacitor 18 to control the charging current directed between trigger capacitor charge means 20 and trigger capacitor 18.

Figure 2:
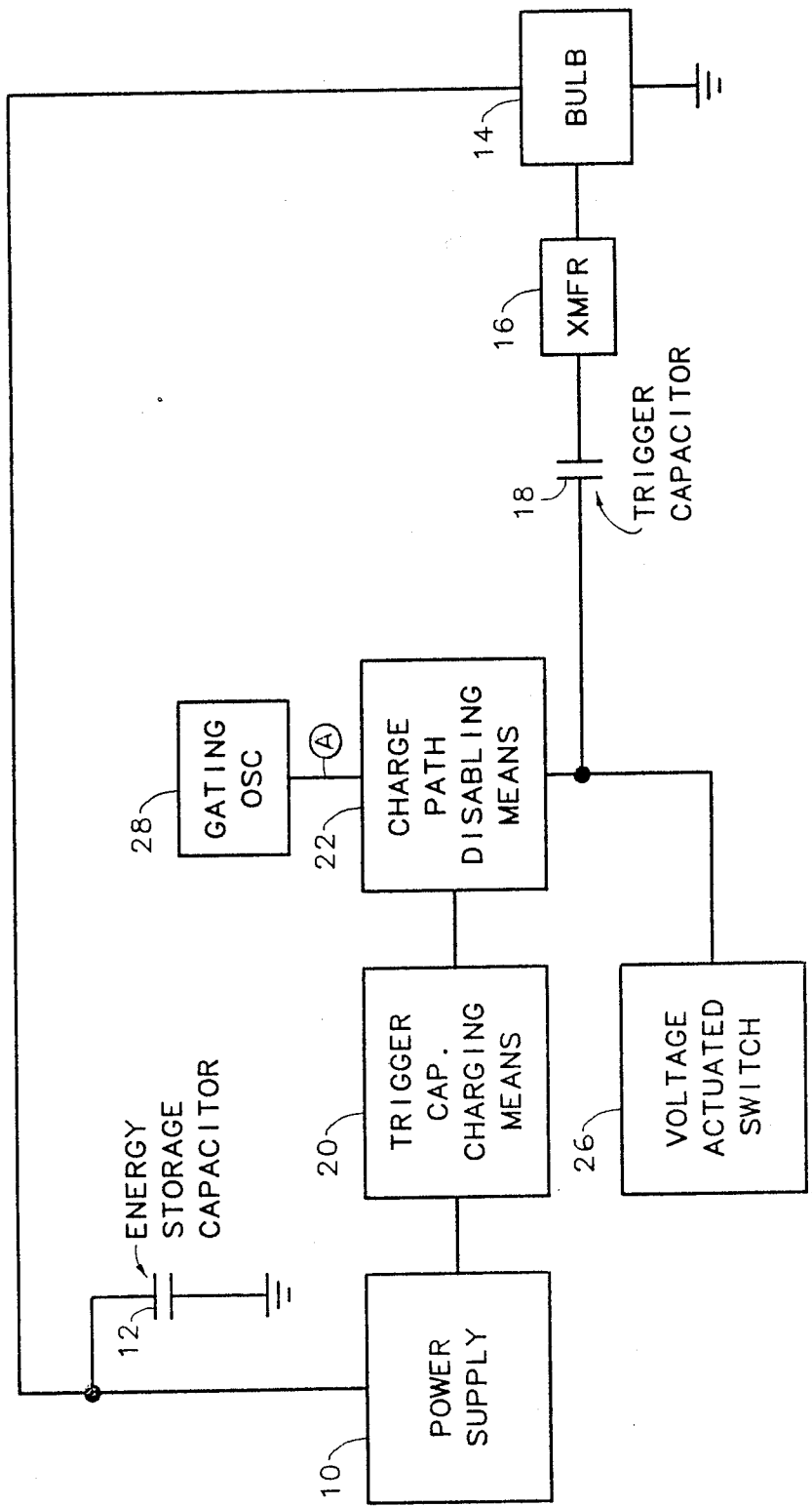
FIG. 2 represents a more specific block diagram embodiment of the strobe trigger pulse generator depicted in FIG. 1.

Referring now to FIG. 2, a more specific embodiment of the strobe trigger pulse generator is depicted where the trigger capacitor discharge means 24 shown in FIG. 1 assumes the form of a voltage actuated switch 26 and where the operation of charge path disabling means 22 is controlled by gating oscillator 28. A specific embodiment of the FIG. 2 circuit is illustrated in the FIG. 3 electrical schematic diagram.

Figure 3:
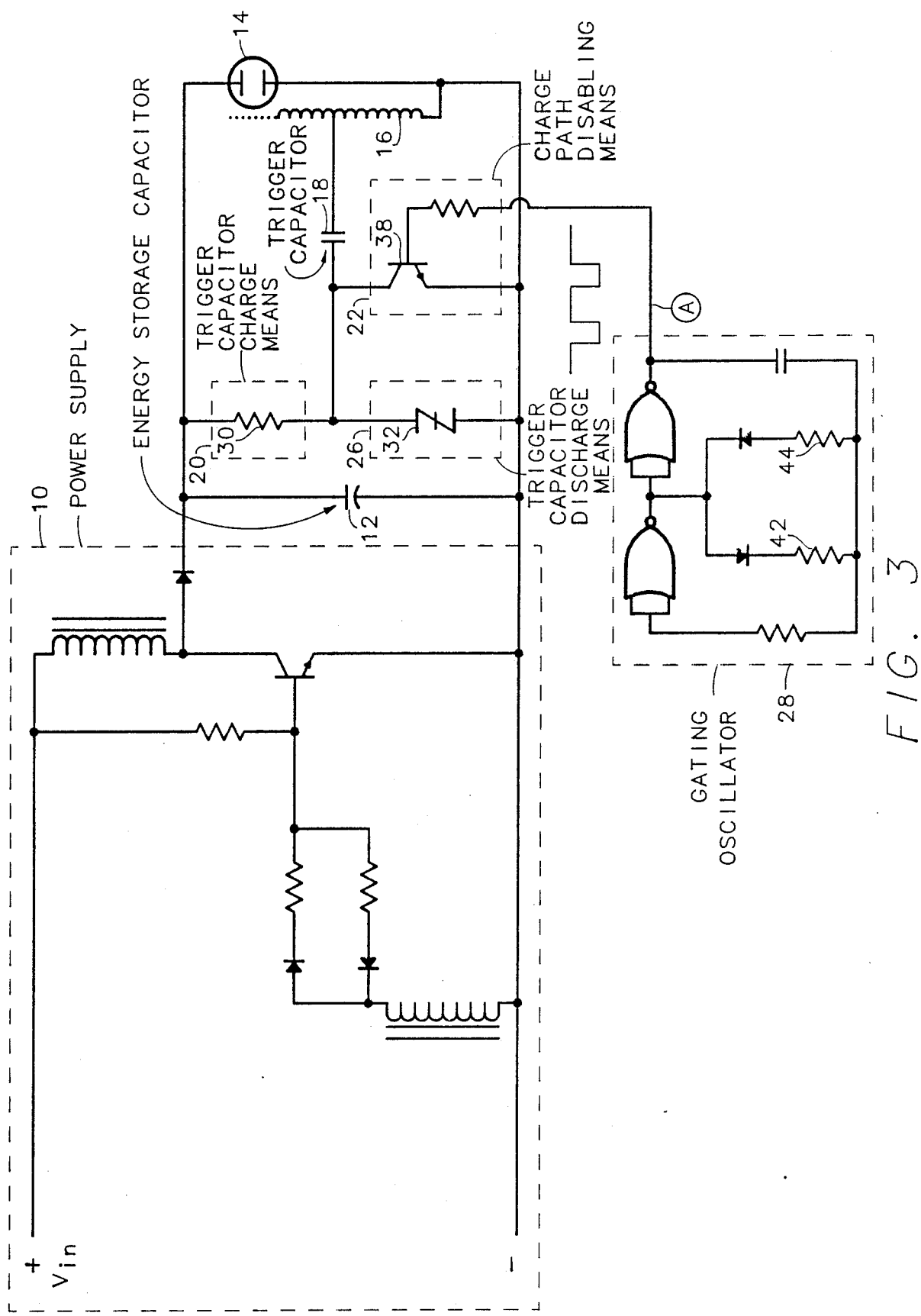
FIG. 3 represents an electrical schematic diagram of a specific preferred embodiment of the FIG. 1 strobe trigger pulse generator.

Referring now to FIG. 3, power supply 10 may take the form of any suitable low voltage DC to high voltage DC converter or an AC to high voltage DC converter circuit of a type well known to one of ordinary skill in the art. The specific circuit embodiment of power supply 10 illustrated in FIG. 3 represents a prior art DC to DC converter circuit of simple design including a single transistor blocking oscillator. The high voltage DC output of power supply 10 is coupled to charge energy storage capacitor 12.

In the FIG. 3 embodiment of the invention, trigger capacitor charge means 20 takes the form of a resistor 30 which controls and limits the flow of current between power supply 10 and trigger capacitor 18. A voltage actuated switch 26 in the form of a sidac 32 is coupled between resistor 30, trigger capacitor 18 and ground. The voltage to current transfer curve of a sidac semiconductor device is illustrated and explained in U.S. Pat. No. 4,755,723 to Sikora which is hereby incorporated by reference. At a comparatively high input voltage level referred to as the breakover voltage or $V_{BO}$, typically on the order of about 130 volts DC, the sidac rapidly switches from an open circuit condition to a short circuit. Beginning at that time, the charge stored in trigger capacitor 18 is rapidly discharged to ground through trigger transformer 16, causing trigger transformer 16 to generate an extremely high voltage trigger pulse for bulb 14. Once the level of trigger capacitor discharge current flowing through sidac 32 falls below the sidac holding current, the sidac switches back from a short circuit condition to an open circuit condition and the flow of current from power supply 10 through resistor 30 resumes and trigger capacitor 18 is rapidly recharged. After the voltage on trigger capacitor 18 once again reaches the sidac breakover voltage, the sidac switches into its short circuit condition and a second trigger pulse is generated.

Resistor 30, trigger capacitor 18 and sidac 32 form a relaxation oscillator, the frequency of which is controlled by the relative values of resistor 30 and trigger capacitor 18.

The operation of the sidac relaxation oscillator as described above is illustrated in timing diagrams 4B and 5B. In FIG. 4B, the X axis represents the time axis while the Y axis represents the voltage on trigger capacitor 18. The sidac $V_{BO}$ threshold level is represented by the dotted horizontal line designated by reference number 34. The horizontal line designated by reference number 36 marks the points at which trigger pulses are actually generated. By referring now to FIGS. 3 and 4, the manner in which the length of the trigger pulse train is controlled will now described.

In FIG. 3, charge path disabling means 22 takes the form of a transistor switch 38, the operation of which is controlled by gating oscillator 28. The square wave output of gating oscillator 28 is illustrated in FIGS. 3 and 4 by the wave form designated "A." The "on time" versus "off time" or duty cycle of gating oscillator 28 is determined by the ratio of resistors 42 and 44. When the output of gating oscillator 28 is high, transistor 38 is turned on and shunts the trigger capacitor voltage to ground. When the output of gating oscillator 28 is low, transistor switch 38 is turned off and the relaxation oscillator as described above operates in a normal free running mode.

Referring now to FIGS. 4A and 4B, timing line 46 is divided by the series of vertical lines into time intervals designated "$T_{ON}$" and "$T_{OFF}$." The time interval "$T_{ON}$" identifies the portion of the gating oscillator duty cycle where shunt switch 38 is turned off permitting the relaxation oscillator to operator normally in the free running or "on" mode. The time interval designated "$T_{OFF}$" indicates the duty cycle time interval when shunt switch 38 is activated to disable the relaxation oscillator. As illustrated in FIG. 4, during the $T_{ON}$ time interval, a pulse train consisting of two trigger pulses is generated. Because the third partial relaxation oscillator cycle depicted in FIG. 4B fails to reach the sidac $V_{BO}$ threshold level, the relaxation oscillator is disabled before the sidac is triggered to generate a third trigger pulse. During the $T_{OFF}$ time interval, the relaxation oscillator is disabled and the trigger pulse generator generates no trigger pulses.

In the FIG. 5 timing diagram, the ratio between resistors 42 and 44 of gating oscillator 28 has been reconfigured to alter the gating oscillator duty cycle such that the $T_{ON}$ time interval is substantially longer than the FIG. 4 $T_{ON}$ time interval. Due to longer $T_{ON}$ time interval depicted in FIG. 5, the trigger pulse generator of the present invention generates a pulse train consisting of six sequential trigger pulses followed by a shorter $T_{OFF}$ time interval.

Because the duty cycle as well as the frequency of gating oscillator 28 can be varied over a wide range, the number of trigger pulses per pulse train can be varied from 0 to a potentially infinite number, and the time interval between sequential pulse trains can be varied from a comparatively short time to a comparatively long time. For a given fixed $T_{ON}$ time interval, the number of trigger pulses within a defined pulse train interval can be varied by modifying the relaxation oscillator RC time constant controlled by resistor 30 and trigger capacitor 18. By this means, the relaxation oscillator operating frequency can be either increased or decreased to control the number of trigger pulses generated within any given $T_{ON}$ time interval.

Figure 8:
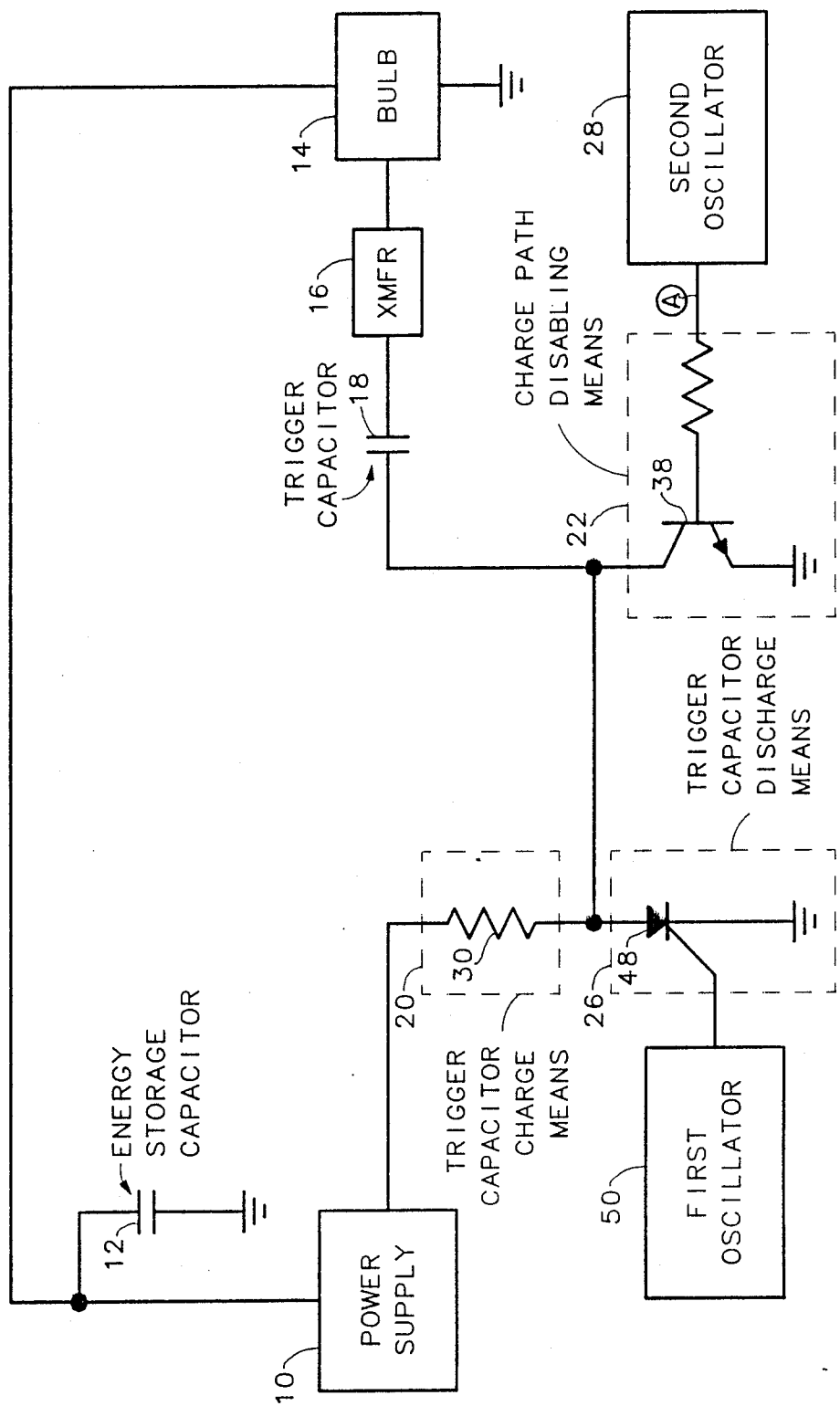
FIG. 8 represents another embodiment of the strobe trigger pulse generator of the present invention including first and second oscillators.

Referring now to FIG. 8, another embodiment of the FIG. 1 invention is depicted. In this embodiment of the invention, trigger capacitor discharge means takes the form of a silicon controlled rectifier or SCR 48. The operation of SCR 48 is controlled by a first oscillator 50 which can take the form of a square wave generator, a sine wave generator, a relaxation oscillator or another equivalent type of oscillator which generates a periodic output waveform. The pulse repetition rate of the trigger pulses generated by the trigger pulse generator of the present invention is determined by the output waveform of first oscillator 50. In FIG. 8, the gating oscillator has been relabelled as second oscillator 28 which controls the duration of the trigger pulse train and the time interval between sequential trigger pulse trains as described above.

Figure 6A:
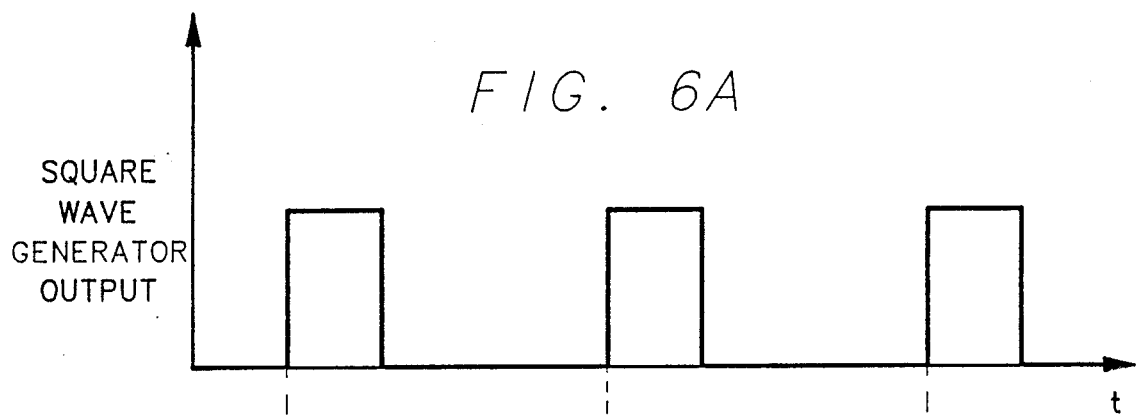
FIG. 6 represents a timing diagram of a prior art trigger pulse generator of the type illustrated in FIG. 7.
Figure 6B:
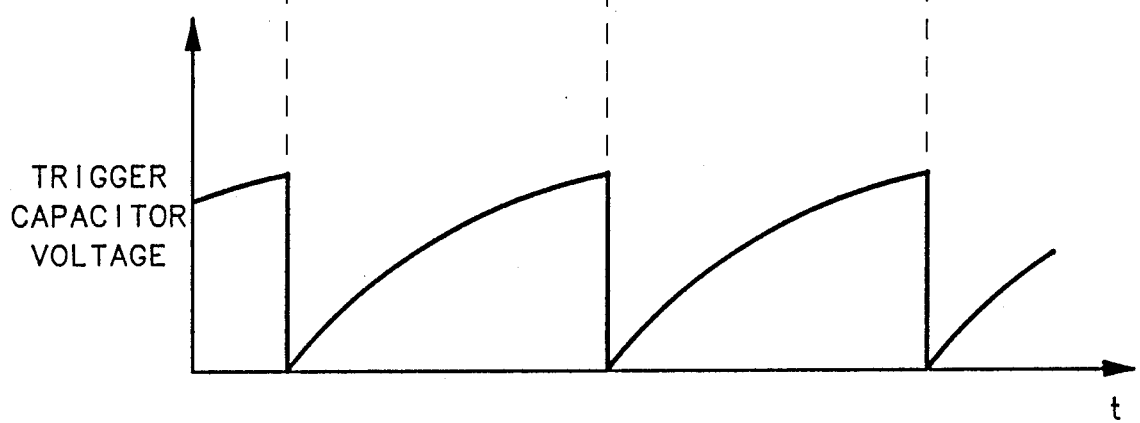
Figure 7:
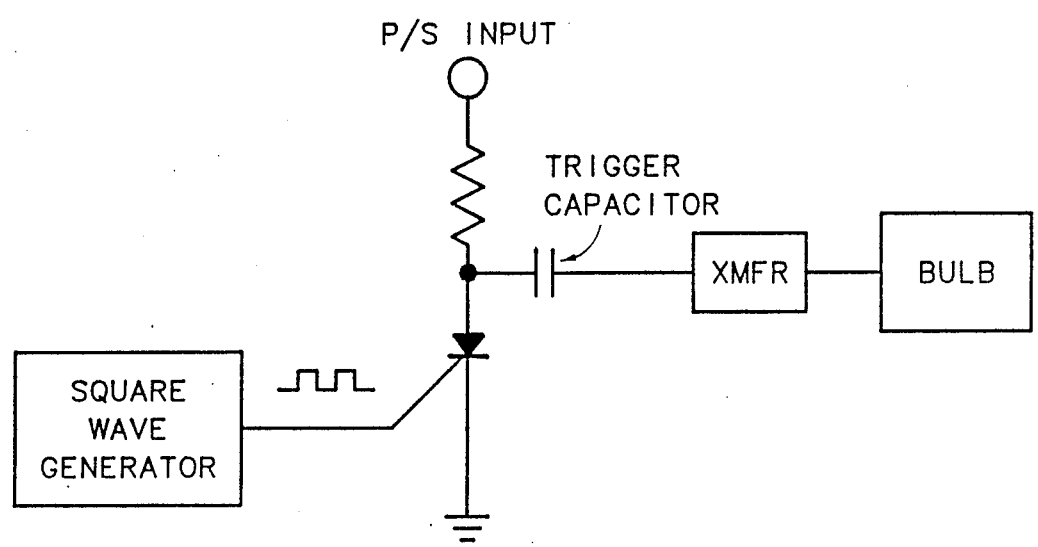
FIG. 7 illustrates a partial electrical schematic diagram of a prior art strobe trigger pulse generator.

The substantial differences between the strobe trigger pulse generator of the present invention and prior art trigger pulse generators can readily be appreciated by evaluating the circuitry and output waveforms of a typical prior art trigger pulse generator as illustrated in FIGS. 6 and 7. The FIG. 7 electrical schematic diagram illustrates that a square wave generator controls the operation of an SCR switch to generate a single trigger pulse in response to each output pulse from a square wave generator. FIG. 6A represents a timing diagram illustrating the output of the square wave generator while timing diagram 6B illustrates the trigger capacitor voltage. The dotted vertical lines interconnecting FIGS. 6A and 6B correspond to the generation of a single trigger pulse at the leading edge of each square wave output pulse. In the prior art Bosnak and Corthell patents described in the Background of the Invention, either paired SCR's or a triac is utilized to generate paired trigger pulses synchronized with both the leading and trailing edges of the square wave output waveform illustrated in FIG. 6A. Such prior art trigger pulse generator circuits are therefore able to induce either a single flash or a double flash output in a strobe flash lamp. In the prior art double flash Bosnak and Corthell devices, the duty cycle of the square wave generator can be varied to vary the time interval between paired trigger pulse pairs or to vary the time interval between paired trigger output pulses.

When the structure and operation of the present invention is compared and contrasted with the prior art single flash and double flash strobe trigger pulse generator circuits described above, the substantial differences between the present invention and such prior art strobe trigger pulse generators are readily apparent. With the present invention, a trigger pulse train including one, two, three, four or any other number of pulses can be generated by merely varying the resistor 42/44 ratio of gating oscillator 28. By substituting a potentiometer for these two resistors in the FIG. 3 embodiment of the invention, the number of trigger pulses generated during any given pulse train can be varied in real time without modifying the structure of the trigger pulse generator.

Although in the FIG. 3 embodiment of the invention, charge path disabling means 22 is illustrated in the form of a shunt switch, that element of the invention could as well be placed in series with the current flow path between power supply 10 and trigger capacitor 18 and take the form of a semiconductor switch which transitions between open and closed circuit configurations to periodically disable the charge path between power supply 10 and trigger capacitor 18. The operating principle of that configuration of the invention would be essentially identical to that described above in connection with FIGS. 1 and 2 above.

In the FIG. 1 embodiment of the invention, charge path disabling means 22 could be either internally controlled or externally controlled by a microprocessor or other control device. The fact that gating oscillator 28 as illustrated in FIGS. 2 and 3 as being outboard of the charge path disabling means 22 is not intended to limit the structure of that element of the invention to such an outboard connection of a control device such as a gating oscillator.

FIG. 1 represents the more generic form of the invention where all appropriate operation and control elements of the charge path disabling means element of the invention are incorporated in a single circuit diagram block. The FIG. 2 and FIG. 3 embodiments of the invention showing an outboard gating oscillator merely represent a more limited and more specific embodiment of the more generalized FIG. 1 embodiment of the invention.

In the FIG. 2 embodiment of the invention, the trigger capacitor discharge means 24 is illustrated as taking the form of a voltage actuated switch. Although in FIG. 3, voltage actuated switch 26 was illustrated as taking the form of a sidac 32, any other form of voltage actuated switch could readily be substituted in either the FIG. 2 or the FIG. 3 embodiments of the invention to serve the same or an equivalent function. A microprocessor controlled device could sense the voltage on trigger capacitor 18 and actuate a semiconductor switch or equivalent device to also serve as a voltage actuated trigger capacitor discharge means.

As shown in FIG. 4 and FIG. 5 timing diagrams, the operating frequency of the voltage actuated switch 26 depicted in FIG. 2 or the first oscillator 50 depicted in FIG. 8 is substantially higher than the operating frequency of the gating oscillator illustrated in FIGS. 2 and 3 or the corresponding second oscillator illustrated in FIG. 8. This relationship merely reflects the conventional strobe light operating characteristics where one or more comparatively short interval flashes are separately by comparatively longer time intervals where no flashes occur.

Figure 9:
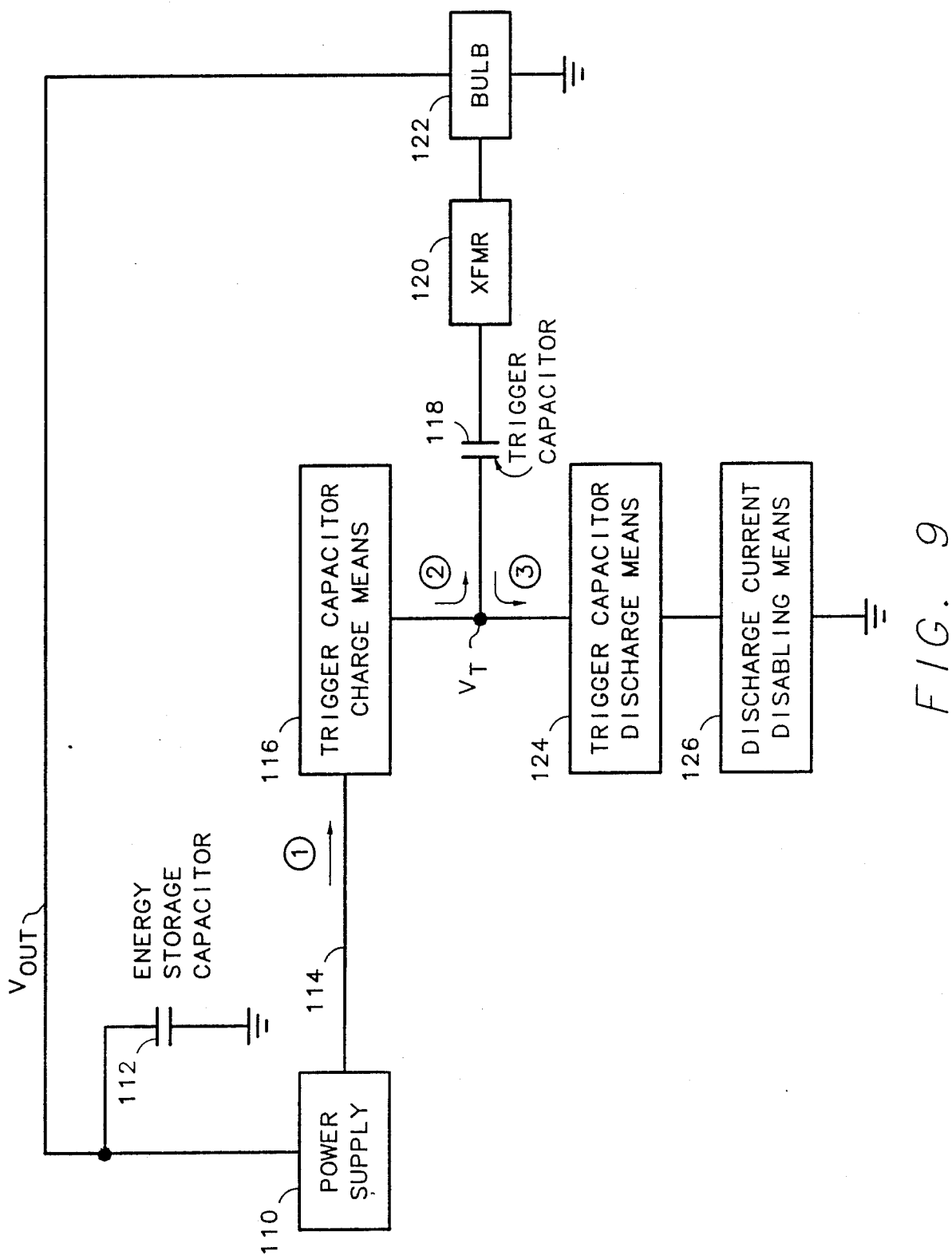
FIG. 9 represents a generalized block diagram of a second type of strobe trigger pulse generator of the present invention where the trigger pulse generator does not draw current from the power supply or energy storage capacitor when the trigger circuit is in the disabled state.
Figure 11:
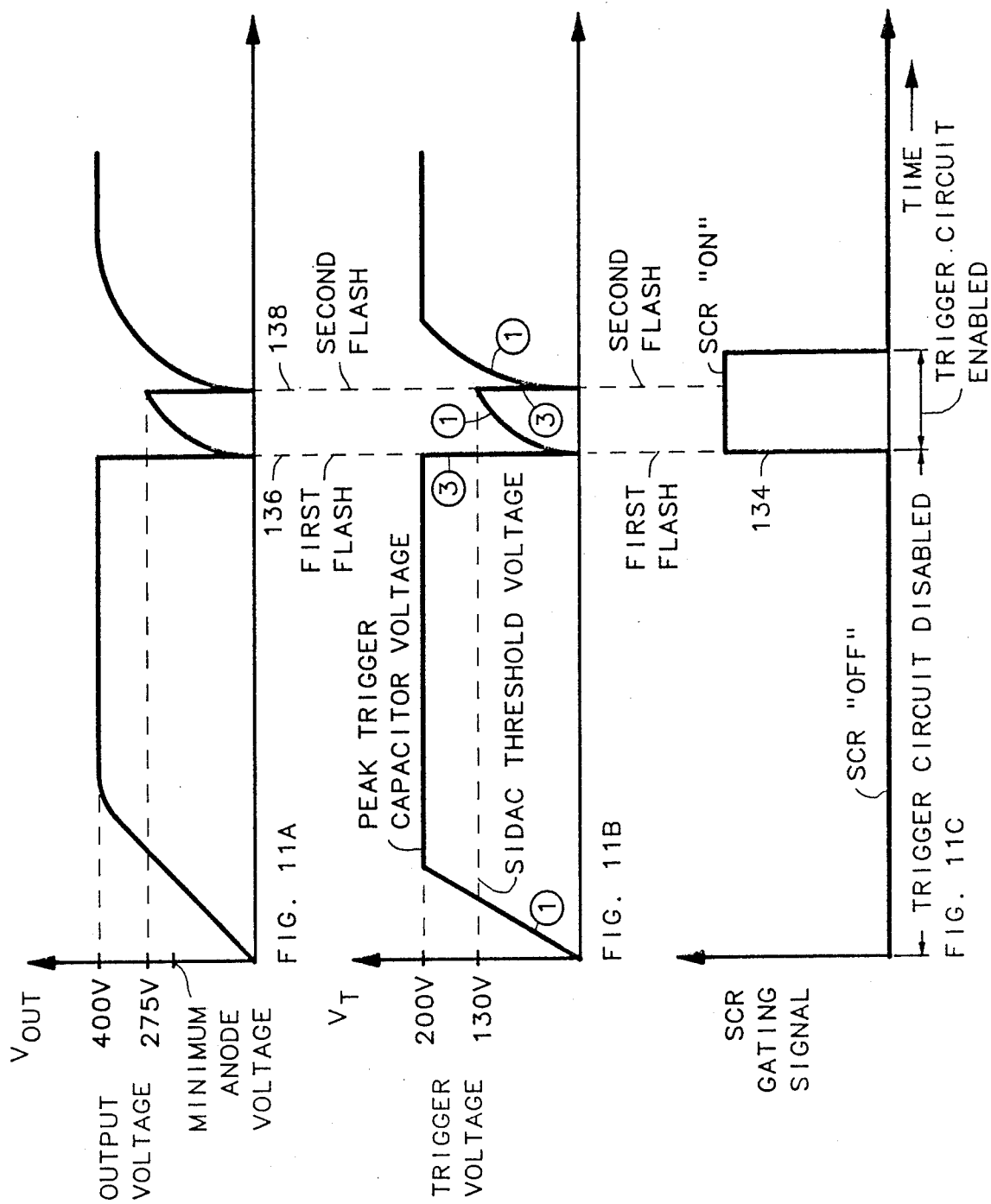
FIG. 11 represents a timing diagram and includes the FIG. 11A diagram of output voltage versus time, the FIG. 11B diagram of trigger capacitor versus time and the FIG. 11C diagram of the SCR gating signal versus time.

Referring now to FIGS. 9-11, a second embodiment of the strobe trigger pulse generator will now be described in detail. With the previous embodiment of the invention, charge path disabling means 22 in the form of transistor shunt switch 38 was turned on to shunt trigger capacitor charge current away from trigger capacitor 18 through switching transistor 38 to ground. The creation of this current flow path maintained a small current flow through trigger capacitor charge means 20 even while the trigger pulse generator circuit was disabled. In some applicationS, the essentially continuous existence of this leakage or bleeder current may be undesirable. In the embodiment of the invention described initially in connection with FIGS. 9-11, a different circuit configuration is utilized which completely eliminates the trickle or bleed current which exists with the strobe trigger pulse generator discussed above.

In the FIG. 9 embodiment of the invention, a power supply 110 generates an output voltage designated $V_{OUT}$ to charge energy storage capacitor 112. Either that same power supply ouput lead or a second power supply output lead designated by reference number 114 is directed to trigger capacitor charge means 116 which directs a trigger capacitor charging current designated by current flow arrow 1 to trigger capacitor 118. As illustrated by timing diagram FIG. 11B, during the initial part of the timing cycle, the input current 1 to trigger capacitor charge means 116 is directed along current flow path 2 to charge trigger capacitor 118 to a peak trigger capacitor voltage.

In the particular embodiment of the invention discussed in connection with FIG. 9, the trigger capacitor may be charged to a level of two hundred volts which represents a typical trigger capacitor voltage. For such specific trigger capacitor voltage levels, a trigger capacitor will have a maximum voltage rating on the order of two hundred and fifty volts to prevent capacitor damage by overvoltage. In other embodiments of the invention, a physically larger trigger capacitor with a higher voltage rating could be utilized and the trigger capacitor could be charged to a higher voltage. The peak trigger capacitor voltage is not particularly significant as long as the voltage output pulse from the trigger capacitor can be stepped up by trigger transformer 120 to provide adequate first stage ionization for the gaseous discharge tube or bulb 122.

As indicated by the FIG. 11A timing diagram, the output of power supply 110 builds up the voltage on energy storage capacitor 112 over a comparatively short period of time to a peak power supply output voltage ($V_{OUT}$) of four hundred volts.

As shown in FIGS. 9 and 10, trigger capacitor 118 is discharged by a series-connected circuit consisting of trigger capacitor discharge means 124 and discharge current disabling means 126. Current flow arrow 3 designates the current flow path during the timing interval that trigger capacitor 118 is being discharged.

As illustrated by FIG. 10, in one embodiment of the invention, trigger capacitor discharge means 124 may take the form of a sidac 128. Similarly, discharge current disabling means 126 may take the form of a silicon controlled rectifier (SCR) 130, the operation of which is controlled by a gating oscillator 132.

Referring now to FIGS. 10, 11B and 11C, sidac 128 closes or assumes a short circuit configuration when the voltage across the sidac reaches a level referred to as the sidac breakover voltage or $V_{BO}$ which is typically on the order of about one hundred and thirty volts. FIG. 11B shows that the trigger voltage $V_T$ very quickly reaches a level of two hundred volts, a level well is excess of the one hundred and thirty volt sidac $V_{BO}$ rating.

The discharge current disabling means circuit 126 prevents any current from flowing through sidac 128 until as shown by the FIG. 11C timing diagram, gating oscillator 132 generates a positive square wave pulse which is coupled to the gate lead of SCR 130. The presence of that square wave pulse on the SCR gate switches the SCR from the "off" state into the "on" state.

When the output of gating oscillator 132 transitions from a low level to a high level, SCR 130 is switched from the "off" state to the "on" state as designated by reference number 134 in FIG. 11C. At this time, current immediately begins flowing through current flow path 3 and sidac 128B as shown by FIG. 11B which results in the discharge to ground of trigger capacitor 118.

The activation of this third current flow path causes current to flow in the primary winding of the trigger transformer which produces a high voltage output pulse on the trigger lead of bulb 122. This high voltage trigger pulse causes first stage ionization of the bulb which lowers the internal bulb impedance.

Since the voltage on energy storage capacitor 112 has reached a level equal to or higher than the bulb minimum anode voltage, energy storage capacitor 112 is then immediately discharge through bulb 122 causing second stage ionization of the bulb. The discharge of energy storage capacitor 112 and the commencement of a first flash is represented by the vertically oriented dotted line designated by reference number 136 in FIG. 11.

The sudden discharge of energy storage capacitor 112 reactivates the DC to Dc converter circuit of power supply 110 and begins recharging energy storage capacitor 112 and trigger capacitor 118 as shown by FIGS. 11A and 11B. As shown by the FIG. 11C timing diagram, the period of gating oscillator 132 is adjusted for this particular mode of operation to maintain SCR 130 in the "on" state until at least the second flash is generated within a short time after the generation of the first flash. In alternative, embodiments of the invention as was the case with the prior embodiments discussed above, the period of gating oscillator 132 can be set to disable and enable the trigger circuit for any desired period of time to control the circuit duty cycle as well as to control the number of trigger pulses generated during any particular train of trigger pulses.

As soon as the voltage on trigger capacitor 118 again reaches the sidac threshold voltage (typically a $V_{BO}$ of one hundred and thirty volts), the sidac assumes a short circuit configuration and causes a second trigger pulse to be generated at the time designated by reference number 138 in FIG. 11. The generation of this second, closely spaced trigger pulse results in the discharge of energy storage capacitor 112 and generates a second closely spaced flash from bulb 122.

Immediately upon completion of this second flash, power supply 110 is reactivated and recharges energy storage capacitor 112 and trigger capacitor 118. A third closely spaced trigger pulse is not generated since the output of gating oscillator 132 assumes a low voltage state, turns "off" SCR 128 and disables the strobe trigger discharge current flow path. Power supply 110 again recharges energy storage capacitor 112 to four hundred volts. The trigger capacitor is simultaneously recharged to its peak value of two hundred volts.

After trigger capacitor 118 has been recharged to its 200 maximum level, the flow of current through current flow path 1 and trigger capacitor charge means 116 terminates, eliminating the trickle or bleed current which existed in the other embodiment of the strobe trigger pulse generator discussed in connection with FIGS. 1–8 above.

FIGS. 10A–10C illustrate that an externally switched transistor or triac or a parallel-connected SCR and zener diode can readily be substituted for sidac 128 to function as alternative embodiments of trigger capacitor discharge means 124 of the present invention. Various other equivalent circuits for accomplishing the objectives of the invention as discussed above such as a microprocessor control system would be readily apparent to one of ordinary skill in the art.

Referring now to FIGS. 12, 13, 14 and 15, another embodiment of the strobe trigger pulse generator of the present invention will now be described in detail.

Figure 12:
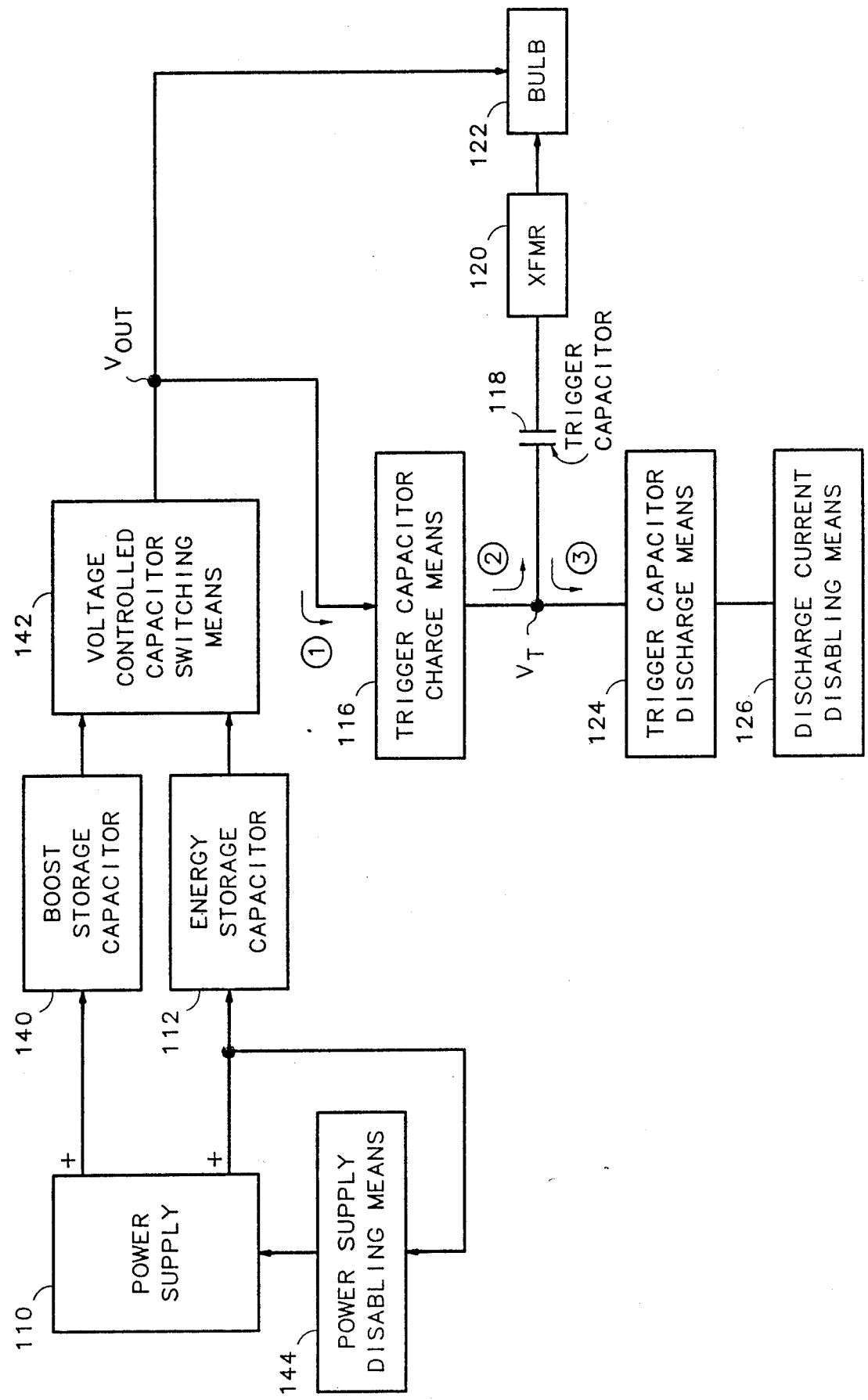
FIG. 12 represents a generalized block diagram of another embodiment of the FIG. 9 invention wherein the power supply output voltage is separately stored in a boost storage capacitor and an energy storage capacitor, the interconnection of which is controlled by voltage controlled capacitor switching means.
Figure 13:
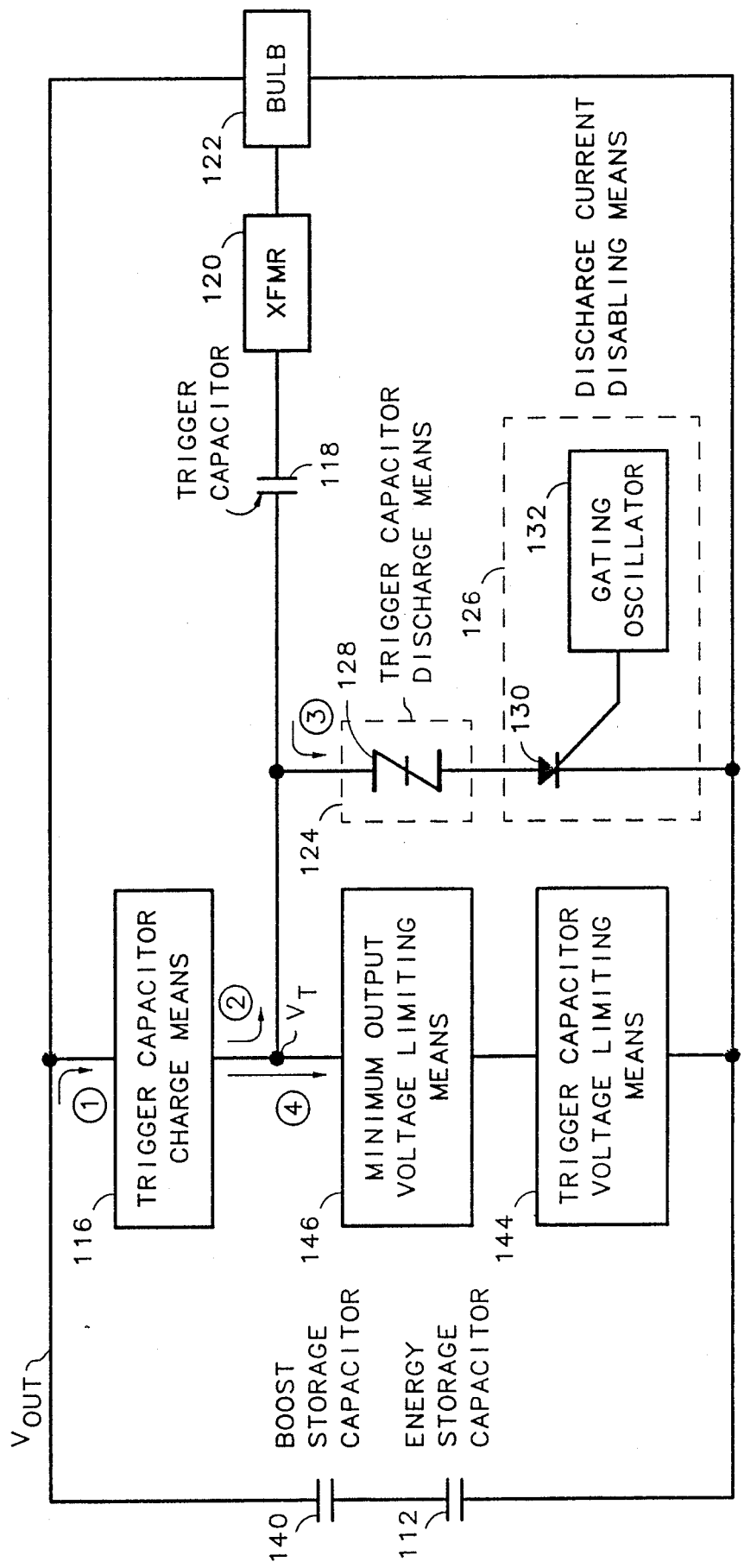
FIG. 13 represents a more specific block diagram of the strobe trigger pulse generator illustrated in FIG. 12.

FIGS. 12 and 13 illustrate that the output of power supply 110 is directed both to a conventional high capacitance rating energy storage capacitor 112 as well as to a boost storage capacitor 140. A detailed explanation of the operation of this switched capacitor system is disclosed in commonly owned U.S. Pat. application Ser. No. 105,714, filed Oct. 6, 1987 and entitled "MEHTOD AND APPARATUS FOR ENERGIZING A GASEOUS DISCHARGE LAMP USING SWITCHED ENERGY STORAGE CAPACITORS. " The complete text of that patent application is hereby incorporated by reference.

Boost storage capacitor 140 typically takes the form of a capacitor having a fairly small capacitance rating (e.g., one microFarad), a very low equivalent series resistance (ESR), and a comparatively high voltage rating. The particular parallel or series interconnection between the high capacitance electrolytic, lower rated voltage energy storage capacitor 112 and boost storage capacitor 140 is controlled by voltage controlled capacitor switching means 142 which in the FIG. 14 embodiment takes the form of a diode 142.

It is undesirable to utilize the "strobe trigger pulse generator" discussed in connection with FIGS. 1-8 above in connection with a strobe power supply utilizing a low capacitance rating boost storage capacitor as shown in FIGS. 12 and 13. Because the boost storage capacitance rating is comparatively small and typically on the order of one microFarad, the trickle or bleed current continuously drawn through resistor R30 by transistor switch 38 as illustrated in FIG. 3 comparatively rapidly discharges boost storage capacitor 140 and reduces its output voltage to an unacceptable low value. This problem is most serious when the DC to DC converter circuit of power supply 110 can be switched between low and high output voltage operating modes, e.g. 275 volts (low voltage) or 400 volts (high voltage).

Since a low output voltage level of 275 volts could be reached in a short time interval, power supply disabling means 144 shown in FIG. 12 will disable power supply 110 shortly after each charging cycling begins. During the balance of the power supply duty cycle and before the strobe trigger circuit is activated, the voltage on boost storage capacitor 140 is drained off in the FIG. 3 embodiment of the invention by the current flow through the trigger capacitor charge means 30 and charge path disabling means 22. This significant reduction in boost storage capacitor voltage will typically reduce the output voltage to bulb 122 below the minimum anode voltage and render the strobe system inoperative.

In the alternative emboddiment of the invention shown in FIGS. 12 and 13, discharge current disabling means 12, forms an open circuit and completely blocks the flow of current from both boost storage capacitor 140 and energy storage capacitor 112 through discharge current path 3 before the trigger circuit is activated. This configuration of the invention prevents the bleed-off of voltage from boost storage capacitor 140 before trigger capacitor discharge means 124 is enabled to generate a series of one or more closely spaced trigger pulses.

Figure 14:
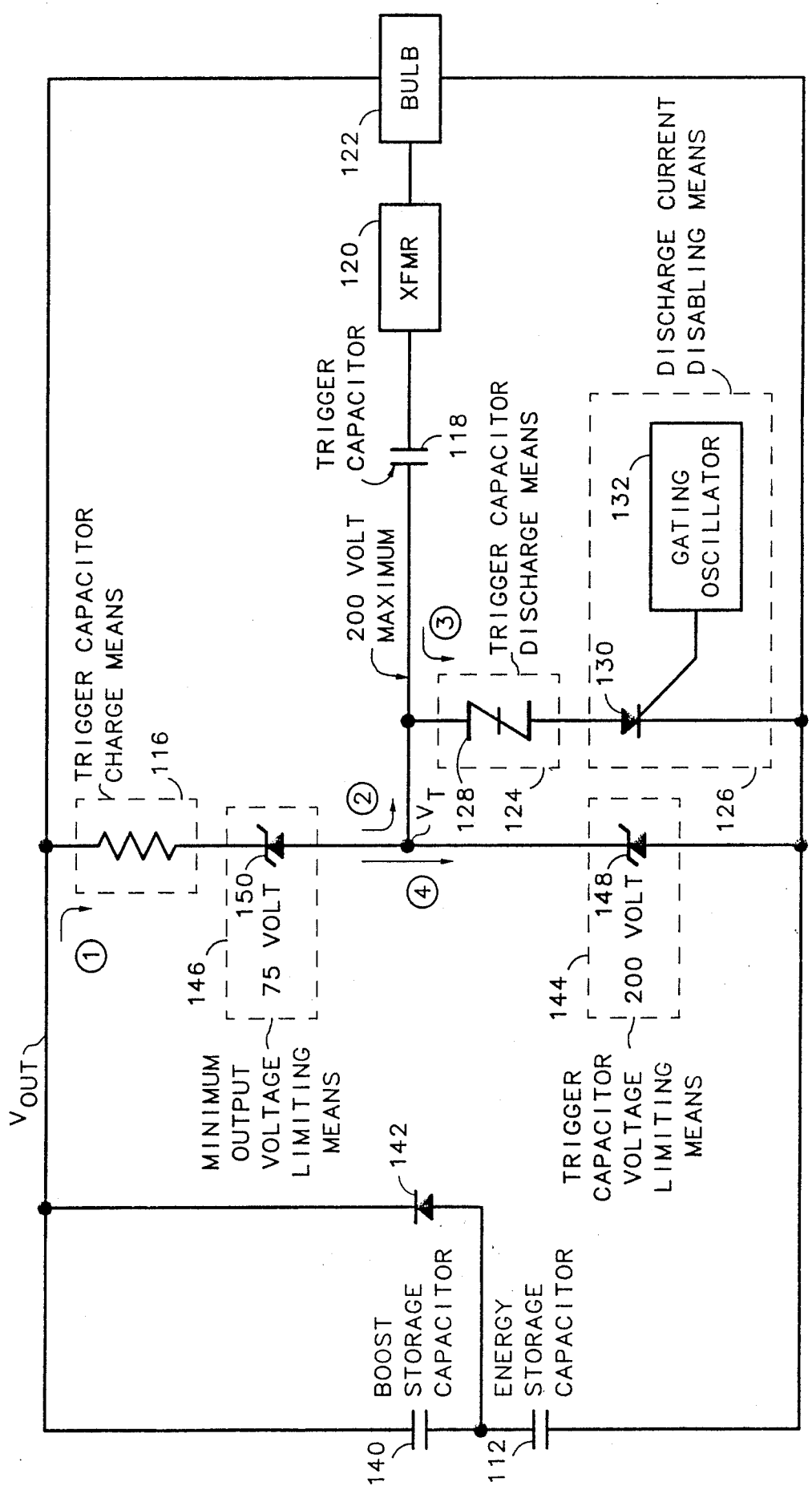
FIG. 14 represents a more specific block diagram embodiment of the strobe trigger pulse generator illustrated in FIG. 13.

Referring now to FIGS. 13 and 14, a more refined version of the FIG. 12 strobe trigger pulse generator is illustrated. In this embodiment of the invention, trigger capacitor voltage limiting means 144 is coupled between trigger capacitor 118 and ground and in parallel with trigger capacitor discharge means 124 and discharge current disabling means 126.

As illustrated in the more detailed FIG. 14 schematic diagram, trigger capacitor voltage limiting means 144 takes the form of a zener diode having a two hundred volt breakdown rating. When the voltage $V_T$ applied to trigger capacittor 118 reaches the two hundred volt maximum desired voltage to be impressed across an only somewhat higher rated trigger capacitor, zener diode 148 breaks down and commences conducting current through current flow path 4 which limits the voltage applied to trigger capacitor 118 to the 200 volt zener diode breakdown voltage.

Since as illustrated in FIG. 16 is may be desirable to limit the minimum capacitor voltage transferred to bulb 122 to two hundred and seventy-five volts to ensure reliable bulb firing, minimum output voltage limiting means 146 is provided. As shown in FIG. 14, this device may take the form of a zener diode 150. Since zener diode 150 is connected in series with zener diode 148, since zener diode 148 has a 200 volt breakdown voltage, and since the minimum $V_{OUT}$ of two hundred and seventy-five volts is desired, the breakdown voltage of zener diode 150 is selected to equal seventy-five volts.

When $V_{OUT}$ decreases to a level of two hundred and seventy-five volts as illustratd in FIG. 15A, all current flow through trigger capacitor charge means 116 ceases since the cumulative breakdown voltage of zener diodes 148 and 150 equals two hundred and seventy-five volts. Thus the minimum $V_{OUT}$ should not drop below two hundred and seventy-five volts ensuring a minimum capacitor voltage which exceeds the 250 volt minimum anode voltage of bulb 122.

The FIGS. 15A, 15B and 15C timing diagrams are closely related to the FIG. 11 timing diagrams and illustrate how the various different aspects of the FIGS. 12, 13 and 14 embodiment of the strobe trigger pulse generator operate in combination with an energy storage capacitance system including an energy storage capacitor 112 and a boost storage capacitor 140.

It will be apparent to those skilled in the art that the disclosed strobe trigger pulse generator may be modified in numerous ways and may assume many embodiments other than the preferred forms specifically set out and described above. For example, many of the functions illustrated and described above could be controlled by a microprocessor-based system rather than by utilizing discrete components such as sidacs, SCR's and zener diodes or a gating oscillator. Accordingly, it is intended by the appended claims to cover all such modifications of the invention which fall within the true spirit and scope of the invention.

I claim:

1. Apparatus for delivering current to an intermittently energized gaseous discharge tube comprising:
   a. a power supply;
   b, an energy storage capacitor coupled to the power supply;
   c. a trigger pulse generator for intermittently generating trigger pulses to energize a trigger pulse transformer including
      i. a trigger capacitor having first and second leads, the first lead being coupled to the trigger pulse transformer;
      ii. trigger capacitor charge means having an input terminal coupled to the power supply and an output terminal coupled to the second lead of the trigger capacitor for establishing a current flow path between the power supply and the trigger capacitor to direct a charge current to the trigger capacitor;
      iii. trigger capacitor discharge means coupled to the second lead of the trigger capacitor for periodically directing a discharge current from the trigger capacitor through the trigger pulse transformer to generate a high voltage trigger pulse; and
      iv. discharge current disabling means coupled in series with the flow of discharge current from the trigger capacitor discharge means for selectively blocking or conducting the flow of discharge current from the trigger capacitor discharge means.

2. The apparatus of claim 1 wherein the discharge current disabling means includes a switching device having conductive nd non-conductive states controlled by a gating oscillator;

3. The apparatus of claim 2 wherein the switching devices includes a semiconductor switching device.

4. The apparatus of claim 3 wherein the semiconductor switching device includes a triac.

5. The apparatus of claim 3 wherein the semiconductor switching device includes a silicon controlled rectifier.

6. The apparatus of claim 3 wherein the semiconductor switching device includes a transistor switch.

7. The apparatus of claim 1 wherein the trigger capacitor discharge means includes a voltage actuated switch coupled to the second lead of the trigger capacitor for periodically discharging the trigger capacitor through the trigger pulse transformer when the voltage across the trigger capacitor reaches a predetermined value.

8. The apparatus of claim 7 wherein the voltage actuated switching means includes a sidac.

9. The apparatus of claim 1 wherein the trigger capacitor charge means includes a resistor.

10. The apparatus of claim 9 wherein the resistor and the trigger capacitor define an RC oscillator circuit.

11. The apparatus of claim 2 wherein the trigger capacitor charge means includes a resistor and wherein the resistor and the trigger capacitor define an RC oscillator circuit having a predetermined period.

12. The apparatus of claim 11 wherein the gating oscillator includes a period and wherein the period of the RC oscillator is related to the period of the gating oscillator such that the trigger pulse generator generates at least first and second closely spaced trigger pulses during the time that the discharge current disabling means conduct discharge current from the trigger capacitor discharge means.

13. The apparatus of claim 12 wherein the trigger capacitor discharge means includes a voltage actuated switch coupled to the second lead of the trigger capacitor for periodically discharging the trigger capacitor through the trigger pulse transformer when the voltage across the trigger capacitor reaches a predetermined value.

14. The apparatus of claim 13 wherein the voltage actuated switching means includes a sidac.

15. Apparatus for flahing a gaseous discharge lamp having a gas interior, anode and cathode terminals, a minimum anode voltage and a minimum holding voltage, comprising:

a. capacitor means including a boost storage capacitor and an energy storage capacitor;
b. a trigger pulse generator for intermittently generating trigger pulses to energize a trigger pulse transformer and for applying a trigger voltage pulse to the lamp to provide first stage ionization of the gas in the lamp including
   i. a trigger capacitor having first and second leads, the first lead being coupled to the trigger pulse transformer;
   ii. trigger capacitor charge means having an input terminal coupled to the power supply and an output terminal coupled to the second lead of the trigger capacitor for establishing a current flow path between the power supply and the trigger capacitor to direct a charge current to the trigger capacitor;
   iii. trigger capacitor discharge means coupled to the second lead of the trigger capacitor for periodically directing a discharge current from the trigger capacitor through the trigger pulse transformer to generate a high voltage trigger pulse;
   iv. discharge current disabling means coupled in series with the flow of discharge current from the trigger capacitor discharge means for selectively blocking or conducting the flow of discharge current from the trigger capacitor discharge means;
c. power supply means coupled to said capacitor means for charging said boost storage capacitor to a first voltage having a magnitude less than the trigger voltage pulse and for charging the energy storage capacitor to a second voltage having a magnitude greater than the minimum holding voltage but less than the minimum anode voltage, wherein the ssum of the first and second voltages exceeds the minimum anode voltage; and
d. voltage controlled capacitor switching means having input terminals coupled across the boost storage capacitor and across the energy storqage capacitor and output terminals coupled to the anode and cathode terminals of the lamp for operating in a first state to apply a boost voltage exceeding the minimum anode voltage to the anode and cathode terminals of the lamp to allow energy to flow into the lamp after the first stage ionization of the gas in the lamp has been achieved by the trigger means to provide second stage ionization of the gas in the lamp and for switching into a second state after the boost voltage falls below the minimum anode voltage but before the boost voltage falls below the minimum holding voltage to couple the energy storage capacitor across the anode and cathode terminals of the lamp to enable the energy storage capacitor to discharge additional energy into the lamp.

16. The apparatus of claim 15 wherein the first voltage exceeds the minimum anode voltage of the tube.

17. The apparatus of claim 16 wherein the second voltage is less than the minimum anode voltage of the lamp.

18. The apparatus of claim 17 wherein the capacitance of the energy storage capacitor is substantially greater than the capacitance of the boost storage capacitor.

19. The apparatus of claim 18 wherein the discharge current disabling means further includes a switching device having conductive and non-conductive states controlled by a gating oscillator.

20. The apparatus of claim 19 wherein the trigger capacitor discharge means includes a voltage actuated switch coupled to the second lead of the trigger capacitor for periodically discharging the trigger capacitor through the trigger pulse transformer when the voltage across the trigger capacitor reaches a predetermined value.

21. The apparatus of claim 20 wherein the voltage actuated switch includes a sidac.

* * * * *